April 2, 1946.                W. SCHADE                2,397,565
                       LARGE APERTURE OBJECTIVE
                         Filed July 11, 1944

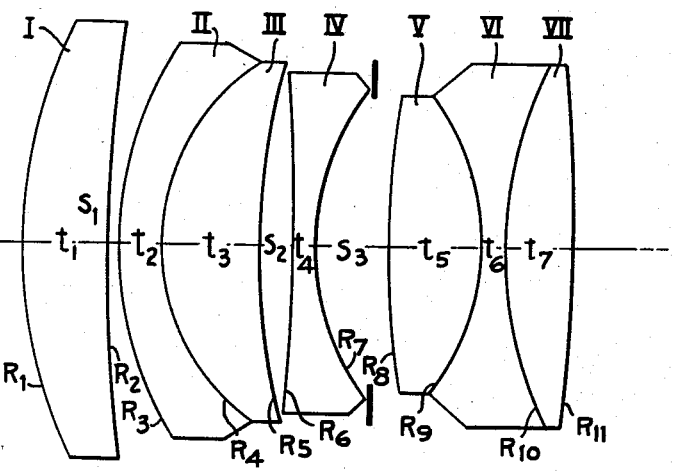

| f/1.5 | | | | F = 100 mm. |
|---|---|---|---|---|
| LENS | N | V | RADII | THICKNESSES |
| I | 1.638 | 55.5 | $R_1 = +74.0$ mm | $t_1 = 12.6$ mm. |
|   |       |      | $R_2 = +287.6$ | $S_1 = 0.6$ |
| II | 1.617 | 38.5 | $R_3 = +50.9$ | $t_2 = 6.0$ |
| III | 1.638 | 55.5 | $R_4 = +30.3$ | $t_3 = 14.2$ |
|   |       |      | $R_5 = +96.7$ | $S_2 = 4.4$ |
| IV | 1.673 | 32.2 | $R_6 = -454.8$ | $t_4 = 3.6$ |
|   |       |      | $R_7 = +35.4$ | $S_3 = 10.9$ |
| V | 1.670 | 47.2 | $R_8 = +121.3$ | $t_5 = 13.7$ |
| VI | 1.541 | 47.5 | $R_9 = -34.0$ | $t_6 = 3.6$ |
| VII | 1.734 | 51.1 | $R_{10} = +57.2$ | $t_7 = 9.1$ |
|   |       |      | $R_{11} = -242.9$ | |

Fig. 3.

| f/1.5 | | | | F = 100 mm. |
|---|---|---|---|---|
| LENS | N | V | RADII | THICKNESSES |
| I | 1.638 | 55.5 | $R_1 = +70.8$ mm | $t_1 = 12.1$ mm. |
|   |       |      | $R_2 = +275.1$ | $S_1 = 0.6$ |
| II | 1.617 | 38.5 | $R_3 = +52.5$ | $t_2 = 5.7$ |
| III | 1.697 | 56.1 | $R_4 = +31.3$ | $t_3 = 13.8$ |
|   |       |      | $R_5 = +87.8$ | $S_2 = 4.2$ |
| IV | 1.689 | 30.9 | $R_6 = -293.6$ | $t_4 = 3.8$ |
|   |       |      | $R_7 = +35.5$ | $S_3 = 10.5$ |
| V | 1.638 | 55.5 | $R_8 = +113.8$ | $t_5 = 13.1$ |
| VI | 1.498 | 67.0 | $R_9 = -32.8$ | $t_6 = 3.5$ |
| VII | 1.697 | 56.1 | $R_{10} = +65.4$ | $t_7 = 10.3$ |
|   |       |      | $R_{11} = -236.1$ | |

Willy Schade
INVENTOR
BY
ATT'Y & AG'T

Patented Apr. 2, 1946

2,397,565

UNITED STATES PATENT OFFICE 2,397,565

LARGE APERTURE OBJECTIVE

Willy Schade, Rochester, N. Y., assignor to Eastman Kodak Company, Rochester, N. Y., a corporation of New Jersey Application July 11, 1944, Serial No. 544,393

6 Claims. (Cl. 88—57)

This invention relates to large aperture photographic objectives.

It is an object of the invention to provide an improved objective as compared with those shown in my Patent 2,259,004, dated October 14, 1941, and particularly to improve the zonal astigmatism.

The lenses shown in my above-mentioned patent are of the type comprising four components axially aligned and airspaced, of which the front two are positive with their front surfaces more strongly curved than their respective rear surfaces, the third component is biconcave and is followed by a diaphragm, and the fourth component is positive and is behind the diaphragm. These features are also shown in my Patent 2,336,300, December 7, 1943. The present invention however relates more closely to the highly corrected large aperture lenses shown in my first-mentioned patent.

Several features contribute to the high degree of correction of those lenses. Particularly noteworthy are the structures of the second and fourth components and the biconvex air-lens enclosed between the second and third components. The second component comprises a negative meniscus element cemented to the front of a meniscus positive element of somewhat higher refractive index concave toward the rear. The fourth component is compound and has two cemented surfaces with opposite curvatures but with dioptric powers of like sign. Preferably the fourth component consists of a biconcave element of low index cemented between two positive elements of higher index.

A biconvex air lens is enclosed between the second and third components. This air lens introduces a high degree of correction of spherical aberration and rim rays. All of these features are discussed in my above-mentioned patent.

According to the present invention the zonal astigmatism is greatly improved by making the negative element of the second component out of glass with a refractive index greater than 1.58 and by making the second component more strongly meniscus in shape such that the radius of curvature of its front surface is between 0.40 F and 0.55 F where F is the focal length of the objective and that of its rear surface is between 0.65 F and 1.40 F. The positive element in this second component should have a refractive index at least 0.01 greater than that of the negative meniscus element cemented to the front of it. Preferably this difference should not be greater than 0.11.

These features show a development of the lens in an unexpected direction. Whereas in the earlier patents a less strongly curved meniscus component with a low index negative element or a greater index difference between the two elements gained a very fine correction of zonal and oblique spherical aberration, I have found that by the novel combination of features herein disclosed a considerable improvement is made in the zonal astigmatism with only a very slight, if any, loss in the correction of zonal spherical aberration quite imperceptible in the final image. Thus the result is a general improvement of the image over the whole field.

A further feature of the invention which cooperates with those described above when the preferred form of the fourth component (i. e. that consisting of a biconcave low index element between two positive high index elements) is used lies in the use of a glass with a refractive index greater than 1.66 and with a dispersive index greater than 50 in the rear element.

In the accompanying drawing:

Fig. 1 shows an axial cross section of a lens according to my invention.

Fig. 2 shows the data for one embodiment, and

Fig. 3 shows the data for an embodiment corrected especially for finite conjugates.

The system illustrated by Figs. 1 and 2 has the following specifications:

*Example 1* f/1.5    F = 100 mm

| Lens | N | V | Radii | Thicknesses |
|---|---|---|---|---|
| I | 1.638 | 55.5 | $R_1=+74.0$ mm. | $t_1=12.6$ mm. |
|   |   |   | $R_2=+287.6$ | $s_1=0.6$ mm. |
| II | 1.617 | 38.5 | $R_3=+50.9$ | $t_2=6.0$. |
| III | 1.638 | 55.5 | $R_4=+30.3$ | $t_3=14.2$. |
|   |   |   | $R_5=+96.7$ | $s_2=4.4$. |
| IV | 1.673 | 32.2 | $R_6=-454.8$ | $t_4=3.6$. |
|   |   |   | $R_7=+35.4$ | $s_3=10.9$. |
| V | 1.670 | 47.2 | $R_8=+121.3$ | $t_5=13.7$. |
| VI | 1.541 | 47.5 | $R_9=-34.0$ | $t_6=3.6$. |
| VII | 1.734 | 51.1 | $R_{10}=+57.2$ | $t_7=9.1$. |
|   |   |   | $R_{11}=-242.9$ |  |

In this and the following tables the lens elements are numbered from front to rear, N indicates the refractive index for the D line of the spectrum and V the dispersive index, and the radii are given as positive or negative accordingly as the surface is convex or concave respectively to the front.

A similar system employing different glasses is as follows:

Example 2

| | | | | |
|---|---|---|---|---|
| f/1.5 | | | | F=100 mm. |

| Lens | N | V | Radii | Thicknesses |
|---|---|---|---|---|
| I | 1.638 | 55.5 | $R_1=+70.8$ mm | $t_1=12.1$ mm. |
| | | | $R_2=+275.0$ | $s_1=0.6$. |
| II | 1.617 | 38.5 | $R_3=+48.7$ | $t_2=5.7$. |
| III | 1.638 | 55.5 | $R_4=+29.0$ | $t_3=13.6$. |
| | | | $R_5=+92.5$ | $s_2=4.2$. |
| IV | 1.673 | 32.2 | $R_6=-580.5$ | $t_4=3.5$. |
| | | | $R_7=+33.8$ | $s_3=8.6$. |
| V | 1.638 | 55.5 | $R_8=+116.0$ | $t_5=13.2$. |
| VI | 1.500 | 61.6 | $R_9=-33.4$ | $t_6=3.5$. |
| VII | 1.697 | 56.1 | $R_{10}=+56.6$ | $t_7=10.3$. |
| | | | $R_{11}=-321.4$ | |

The following system, illustrated by Figs. 1 and 3, has a nominal speed (i. e. taken at infinite object distance) of f/1.5 and is corrected especially for a magnification ratio of 1:4. Its specifications are as follows:

Example 3

| | | | | |
|---|---|---|---|---|
| f/1.5 | | | | F=100 mm. |

| Lens | N | V | Radii | Thicknesses |
|---|---|---|---|---|
| I | 1.638 | 55.5 | $R_1=+70.8$ mm | $t_1=12.1$ mm. |
| | | | $R_2=+275.0$ | $s_1=0.6$. |
| II | 1.617 | 38.5 | $R_3=+52.5$ | $t_2=5.7$. |
| III | 1.697 | 56.1 | $R_4=+31.3$ | $t_3=13.8$. |
| | | | $R_5=+87.8$ | $s_2=4.2$. |
| IV | 1.689 | 30.9 | $R_6=-293.6$ | $t_4=3.8$. |
| | | | $R_7=+35.5$ | $s_3=10.5$. |
| V | 1.638 | 55.5 | $R_8=+113.8$ | $t_5=13.1$. |
| VI | 1.498 | 67.0 | $R_9=-32.8$ | $t_6=3.5$. |
| VII | 1.697 | 56.1 | $R_{10}=+65.4$ | $t_7=10.3$. |
| | | | $R_{11}=-236.1$ | |

Example 1 has an exceptionally high index element in the extreme rear. Its refractive index is greater than 1.70 and its dispersive index greater than 50. Example 3 has a high index positive element in the second component, its refractive index is greater than 1.66 and its dispersion is such that ($N_f-N_c$) is greated than 0.1 ($N_d-1.55$) to permit proper achromatizing. For practical purposes this means that the dispersive index of this preferred embodiment is and must be greater than 46 and less than 70 when N equals 1.7; between 32 and 57 when N equals 1.8 and between 26 and 45 when N equals 1.9. Certain Kodak glasses and certain Schott glasses are within this range. These high refractive indices are of great value in correcting the zonal and oblique spherical aberration.

That each of the systems has all the other features of the invention is evident from the tables. One additional point that may be particularly mentioned is that in Example 3 the index difference within the second component is 0.080 whereas it is only 0.021 in Examples 1 and 2.

What I claim is:

1. A highly corrected unsymmetrical photographic objective of the type comprising four airspaced components axially aligned, of which the front one is positive with its more strongly curved surface to the front, the second one is a positive meniscus convex to the front, the third one is biconcave and is followed by a <u>diaphragm</u> and the fourth one is positive, is behind the diaphragm, is compound, and has two cemented surfaces oppositely curved but with power of like sign, the objective being characterized by the second component consisting of a negative element with a refractive index greater than 1.58 cemented to the front of a positive element with a refractive index greater by between 0.01 and 0.11 than that of the negative element and by the front and rear surfaces of the second component having radii of curvature between 0.40 F. and 0.55 F and between 0.65 F and 1.40 F respectively where F is the focal length of the objective.

2. An objective according to claim 1 in which the fourth component consists of a biconcave element cemented between two positive elements of higher index, the rear one of which has a dispersive index greater than 50 and a refractive index greater than 1.66.

3. An objective according to claim 1 in which the positive element of the second component is made of a glass in which $$1.66 < N < 2.10$$

and $$\frac{(N-1.55)}{10} > \frac{N-1}{V} > \frac{(N-1.50)}{20}$$

where N is the refractive index for the D line of the spectrum, and V is the dispersive index.

4. An objective substantially according to the following specifications:

| Lens | N | V | Radii | Thicknesses |
|---|---|---|---|---|
| I | 1.64 | 56 | $R_1=+0.7$ F | $t_1=0.1$ F. |
| | | | $R_2=+2.9$ F | $s_1<0.1$ F. |
| II | 1.62 | 38 | $R_3=+0.5$ F | $t_2=0.1$ F. |
| III | 1.64 | 56 | $R_4=+0.3$ F | $t_3=0.1$ F. |
| | | | $R_5=+1.0$ F | $s_2<0.1$ F. |
| IV | 1.67 | 32 | $R_6=-5.$ F | $t_4<0.1$ F. |
| | | | $R_7=+0.4$ F | $s_3=0.1$ F. |
| V | 1.67 | 47 | $R_8=+1.2$ F | $t_5=0.1$ F. |
| VI | 1.54 | 48 | $R_9=-0.3$ F | $t_6<0.1$ F. |
| VII | 1.73 | 51 | $R_{10}=+0.6$ F | $t_7=0.1$ F. |
| | | | $R_{11}=-2.4$ F | | where the first column designates the lens elements by Roman numerals in order from front to rear and where F is the focal length of the objective, N is the index of refraction for the D line of the spectrum, V is the dispersive index, R, t, and s refer respectively to the radii of curvature of the refractive surfaces, the thicknesses of the elements, and the airspaces between the components, the subscripts on these refer to the surfaces, the elements, and the spaces numbered consecutively from the front, and the + and − signs in the fourth column correspond to surfaces which are respectively convex and concave to the front.

5. An objective substantially according to the following specifications:

| Lens | N | V | Radii | Thicknesses |
|---|---|---|---|---|
| I | 1.64 | 56 | $R_1=+.7$ F | $t_1=.1$ F. |
| | | | $R_2=+2.8$ F | $s_1<.1$ F. |
| II | 1.62 | 39 | $R_3=+.5$ F | $t_2=.1$ F. |
| III | 1.64 | 56 | $R_4=+.3$ F | $t_3=.1$ F. |
| | | | $R_5=+.9$ F | $s_2<.1$ F. |
| IV | 1.67 | 32 | $R_6=-5.8$ F | $t_4<.1$ F. |
| | | | $R_7=+.3$ F | $s_3=.1$ F. |
| V | 1.64 | 56 | $R_8=+1.2$ F | $t_5=.1$ F. |
| VI | 1.50 | 62 | $R_9=-.3$ F | $t_6<.1$ F. |
| VI | 1.70 | 56 | $R_{10}=+.6$ F | $t_7=.1$ F. |
| | | | $R_{11}=-3.2$ F | | where the first column designates the lens elements by Roman numerals in order from front to rear and where F is the focal length of the objective, N is the index of refraction for the D line of the spectrum, V is the dispersive index, R, t, and s refer respectively to the radii of curvaaure of the refractive surfaces, the thicknesses of the elements, and the airspaces between the components, the subscripts on these refer to the surfaces, the elements, and the spaces numbered consecutively from the front, and the + and − signs in the fourth column correspond to surfaces which are respectively convex and concave to the front.

6. An objective substantially according to the following specifications:

| Lens | N | V | Radii | Thicknesses |
|---|---|---|---|---|
| I | 1.64 | 56 | $R_1 = +.7$ F | $t_1 = .1$ F. |
|  |  |  | $R_2 = +2.8$ F | $s_1 = <.1$ F. |
| II | 1.62 | 39 | $R_3 = +.5$ F | $t_2 = .1$ F. |
| III | 1.70 | 56 | $R_4 = +.3$ F | $t_3 = .1$ F. |
|  |  |  | $R_5 = +.9$ F | $s_2 = <.1$ F. |
| IV | 1.69 | 31 | $R_6 = -2.9$ F | $t_4 = <.1$ F. |
|  |  |  | $R_7 = +.4$ F | $s_3 = .1$ F. |
| V | 1.64 | 56 | $R_8 = +1.1$ F | $t_5 = .1$ F. |
| VI | 1.50 | 67 | $R_9 = -.3$ F | $t_6 = <.1$ F. |
| VII | 1.70 | 56 | $R_{10} = +.7$ F | $t_7 = .1$ F. |
|  |  |  | $R_{11} = -2.4$ F |  | where the first column designates the lens elements by Roman numerals in order from front to rear and where F is the focal length of the objective, N is the index of refraction for the D line of the spectrum, V is the dispersive index, R, t, and s refer respectively to the radii of curvature of the refractive surfaces, the thicknesses of the elements, and the airspaces between the components, the subscripts on these refer to the surfaces, the elements, and the spaces numbered consecutively from the front, and the + and − signs in the fourth column correspond to surfaces which are respectively convex and concave to the front.

WILLY SCHADE.